United States Patent [19]

Matsuo

[11] Patent Number: 5,989,009

[45] Date of Patent: Nov. 23, 1999

[54] SYNTHETIC RESIN GRANULATING DIE

[75] Inventor: Toshio Matsuo, Hiroshima, Japan

[73] Assignee: The Japan Steel Works, Ltd., Tokyo, Japan

[21] Appl. No.: 09/021,988

[22] Filed: Feb. 11, 1998

[30] Foreign Application Priority Data

Mar. 28, 1997 [JP] Japan .................................. 9-077487

[51] Int. Cl.⁶ .............................. B29B 9/06; B29C 47/30; B29C 47/86
[52] U.S. Cl. .............................. 425/464; 425/67; 425/313
[58] Field of Search .............................. 425/67, 313, 464

[56] References Cited

U.S. PATENT DOCUMENTS

| | | | |
|---|---|---|---|
| 3,436,449 | 4/1969 | Treu et al. | 425/67 |
| 3,516,120 | 6/1970 | Braun et al. | 425/67 |
| 3,749,536 | 7/1973 | Remsheid et al. | 425/464 |
| 4,123,207 | 10/1978 | Dudley | 425/67 |
| 4,752,196 | 6/1988 | Wolfe, Jr. | 425/67 |
| 4,764,100 | 8/1988 | Lambertus | 425/67 |
| 4,856,974 | 8/1989 | Wolfe, Jr. | 425/67 |
| 4,934,916 | 6/1990 | Lambertus | 425/67 |
| 5,714,173 | 2/1998 | Matsuo | 425/464 |

FOREIGN PATENT DOCUMENTS

| | | | |
|---|---|---|---|
| 1720868 | 3/1992 | U.S.S.R. | 425/67 |
| WO 81/01980 | 7/1981 | WIPO | 425/67 |

OTHER PUBLICATIONS

Derwent abstract of Japanese reference 08–192423A, Jul. 1996.

*Primary Examiner*—Robert Davis
*Attorney, Agent, or Firm*—Sughrue, Mion, Zinn, Macpeak & Seas, PLLC

[57] ABSTRACT

Retaining boards 14 and 18 having vacuum heat-insulating layers 17 and 21 are provided on the surface of a granulating die except a hardening layer 13 having a number of nozzle holes 2, namely, the surfaces of the granulating die 1 which are outside and inside of the hardening layer 13.

11 Claims, 3 Drawing Sheets

SYNTHETIC RESIN GRANULATING DIE

BACKGROUND OF THE INVENTION

1. Field of the Invention

This invention relates to synthetic resin granulating dies, and more particularly to a synthetic resin granulating die having heat insulating structure which is applicable to an underwater granulating machine.

2. Related Art

In an underwater granulating machine, the surface of its granulating die is cooled with circulating water, and therefore sometimes molten resin is solidified in the nozzles of the granulating die; in other words, they are so-called "clogged up". In order to prevent the "clogged up" phenomenon, the present Applicant has before proposed a synthetic resin granulating die which has the following structure and function.

FIG. 3 shows the left half of the granulating die. FIG. 4 is an enlarged diagram of the part B of FIG. 3. More specifically, the part (a) of FIG. 4 is a diagram showing the arrangement of a nozzle section, and the part (b) of FIG. 4 is a sectional view taken along line C—C in the part (a) of FIG. 4.

As shown in FIGS. 3 and 4, the granulating die 1 has an outside annular path 5, and an inside annular path 6. And a number of heating jackets 3 are provided between the two annular paths 5 and 6. The outside annular path 5 is divided into upper and lower outside annular paths 5a and 5b by right and left blocks 7. The upper and lower outside annular paths 5a and 5b have a heating-fluid lead-in path 8 and a heating-fluid lead-out path 9, respectively. A vacuum heat-insulating layer 4, which is sealed by electronic beam welding, is formed on the surface side of the granulating die in such a manner that it is adjacent to each of the heating jackets 3. A number of nozzles holes 2 are formed between the heating jackets 3. A hardening layer 13 is provided in the surface of the granulating die between the outside annular path 5 and the inside annular path 6. A flange 10 is mounted on the periphery of the granulating die 1. Circulating-box mounting bolt holes 11, and granulating-die mounting bolt holes are formed in the flange 10 thus mounted.

Now, the function of the above-described granulating die will be described.

The heating fluid introduced through the lead-in path 8 is passed through one outside annular path 5a, the heating jackets on both sides of the lines of the nozzles holes, and the inside annular path 6 (a part of the heated fluid passing through only the heating jackets), and then discharged through the other outside annular path 5b. The surface of the granulating die 1 is cooled being in contact with the circulating water. On the other hand, the vacuum heat-insulating layers 4 are formed on the surface side of the granulating die 1 in such a manner that they are adjacent to the heating jackets 3, and therefore the cooling is interrupted, and the nozzle holes 2 are sufficiently heated by the heating fluid flowing through the heating jacket, which prevents the solidification of molten resin at the nozzle holes 2.

In the above-described conventional granulating die, the vacuum heat-insulating layers are formed on the surface side thereof, which improves the heat-insulating effect. However, the heating-insulating effect is only for the region where the hardening layer is provided which is between the outside annular path and the inside annular path. Hence, the surfaces of the die which are inside and outside of the hardening layer is cooled with the circulating water in the circulating box, so that the temperature of the whole die is decreased. On the other hand, a granulating die is known in the art in which a resin gasket is mounted on the surface of the die except the hardening layers, and is retained with a retaining board of stainless steel, thereby to prevent the decrease in temperature of the whole die. However, the granulating die suffers from the following difficulties. That is, the higher the resin gasket is in heat insulating, the more it is liable to be deteriorated by heat. Therefore, it is soon broken, and accordingly it is necessary to replace it frequently.

SUMMARY OF THE INVENTION

An object of the invention is to eliminate the above-described difficulties accompanying a conventional synthetic resin granulating die. More specifically, an object of the invention is to provide a synthetic resin granulating die in which the surface of the granulating die which is cooled by the circulating water in the circulating box is improved in heat insulating effect, so that the nozzle holes are prevented from being excessively cooled by the circulating water, thus being prevented from being clogged up, whereby fine pellets are formed at all times.

The foregoing object of the invention has been achieved by the provision of a synthetic resin granulating die in which, according to the invention, retaining boards having vacuum heat-insulating layers are provided on the surface of the die except a hardening layer having a number of nozzle holes, namely, the surfaces of the die which are outside and inside of the hardening layer.

More specifically, in the granulating die, the annular outside retaining board having the vacuum heat insulating layer is provided on the surface of the die which is outside of the hardening layer having a number of nozzle holes.

Furthermore, in the synthetic resin granulating die, the circular-disk-shaped inside retaining board having the vacuum heat insulating layer is provided on the surface of the die which is inside of the hardening layer.

It is preferable that each of the retaining boards is formed by welding the peripheries of two pieces of stainless steel boards together by electronic beam welding.

In addition, it is preferable that vacuum heat-insulating layers are provided on the die surface side of heating jackets provided between a number of lines of the nozzles holes.

BRIEF DESCRIPTION OF THE DRAWING(S)

FIGS. 1(a) and 1(b) are a diagram showing a granulating die with retaining boards having vacuum heat-insulating layers. More specifically, the FIG. 1(a) is a sectional view taken along line A—A in FIG. 1(b), and FIG. 1(b) is a front view of the granulating die;

FIG. 4(a) is a diagram showing the arrangement of a nozzle section, and FIG. 4(b) is a sectional view taken along line C—C in FIG. 4(a).

DETAILED DESCRIPTION OF THE PREFERRED EMBODIMENTS

An preferred embodiment of the invention will be described with reference to the accompanying drawings.

Figure 2:
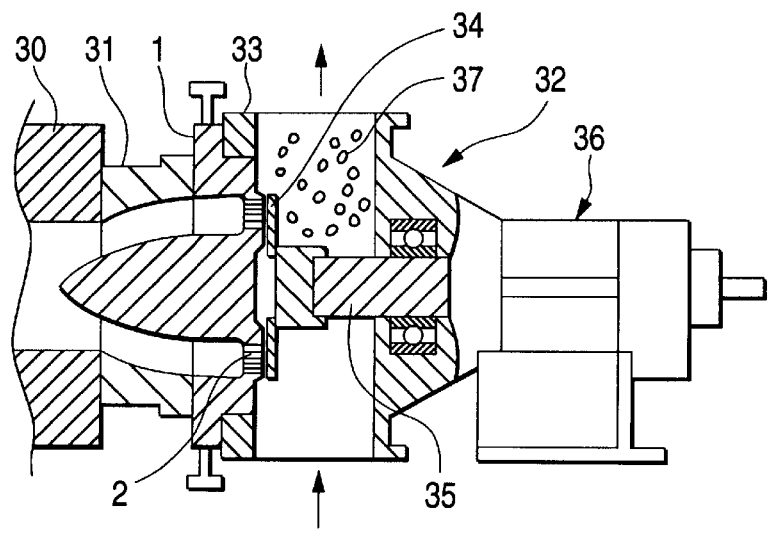
FIG. 2 is a sectional view showing essential components of an underwater granulating die.

FIG. 2 is a vertical sectional view showing essential components of an underwater granulating machine according to the invention. As shown in FIG. 2, a granulating die 1 having a number of nozzle holes 2 is coupled through a die head 31 to the end of an extruding machine 30. An underwater cutting device 32 is mounted on the granulating die 1 or the die head 2. The underwater cutting device 32 comprises: a circulating box 33 adapted to circulate a circulating water (cooling water or hot water); and a drive section 36 adapted to rotate a number of cutter blades 34 with the aid of a cutter shaft 35 which are directed towards the surface of the granulating die 1.

Figure 3:
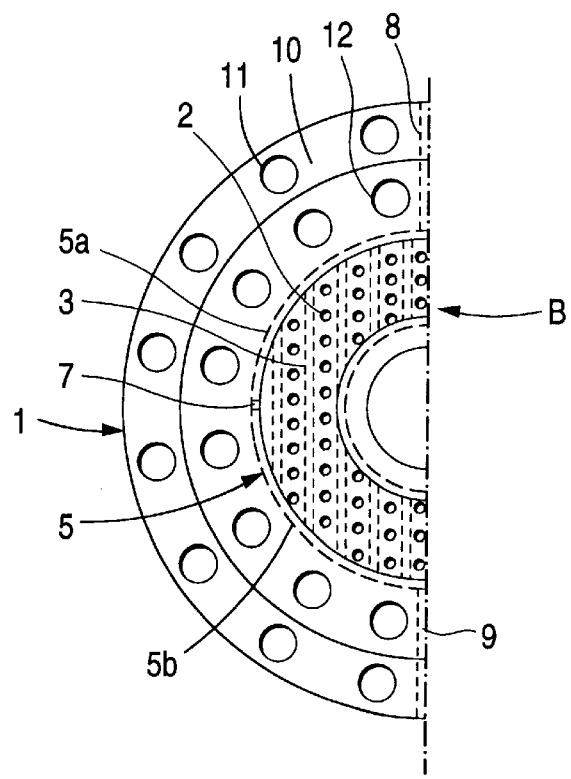
FIG. 3 is a diagram showing the left half of a conventional granulating die.
Figure 4:
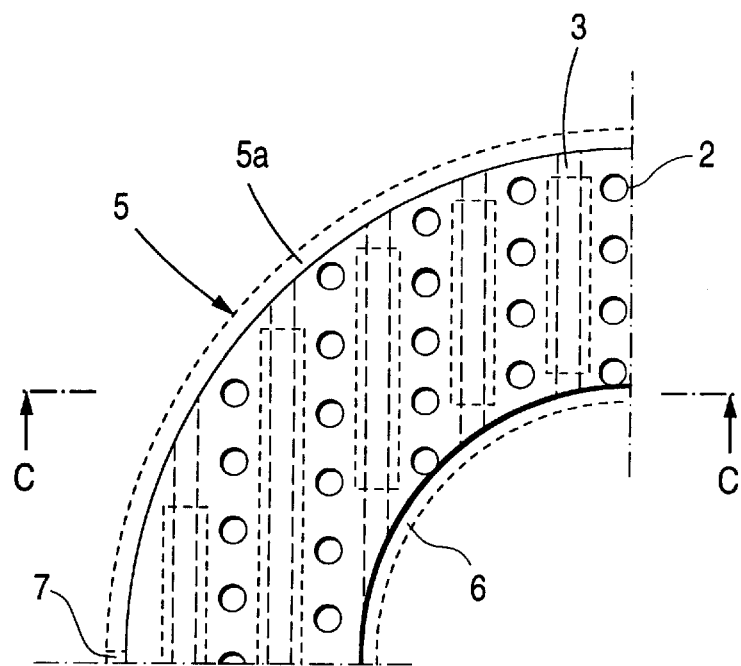
FIGS. 4(a) and 4(b) are an enlarged diagram of the part B of FIG. 3. More specifically.
Figure 4:
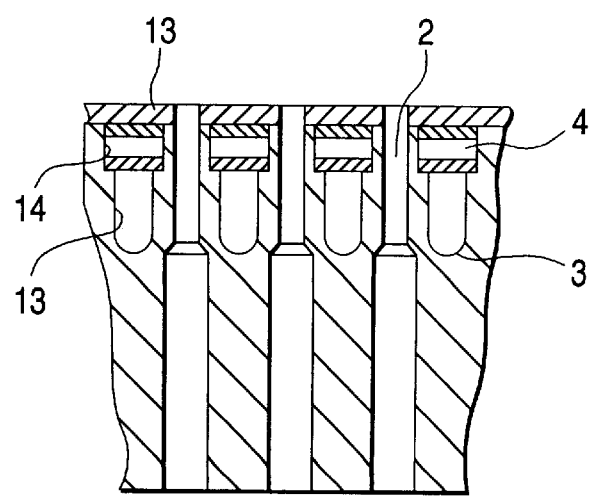

As was described with reference to FIGS. 3 and 4 in the "Description of the Related Art", the granulating die 1 has the outside annular path 5 and the inside annular path 6, and between those annular paths 5 and 6 a number of heating jackets 3 are arranged parallel or radially. The outside annular path 5 has right and left blocks 7 so as to be divided into the upper and lower outside annular paths 5a and 5b. Those paths 5a and 5b had the heating fluid lead-in path 8 and the heating fluid lead-out path 9, respectively, in such a manner that those paths 8 and 9 are communicated with each other.

Vacuum heat-insulating layers 4, which are sealed by electronic beam welding, are formed on the surface side of the die 1 in such a manner that they are adjacent to the heating jackets. A number of nozzle holes 2 are provided between the aforementioned heating jackets. A hardening layer 13 is provided in the surface of the granulating die 1 which is between the outside annular path 5 and the inside annular path 6.

Figure 1:
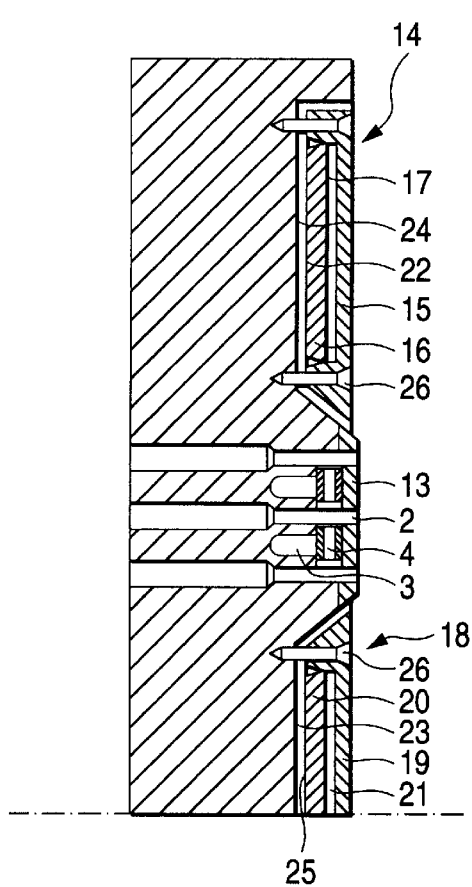
Figure 1:
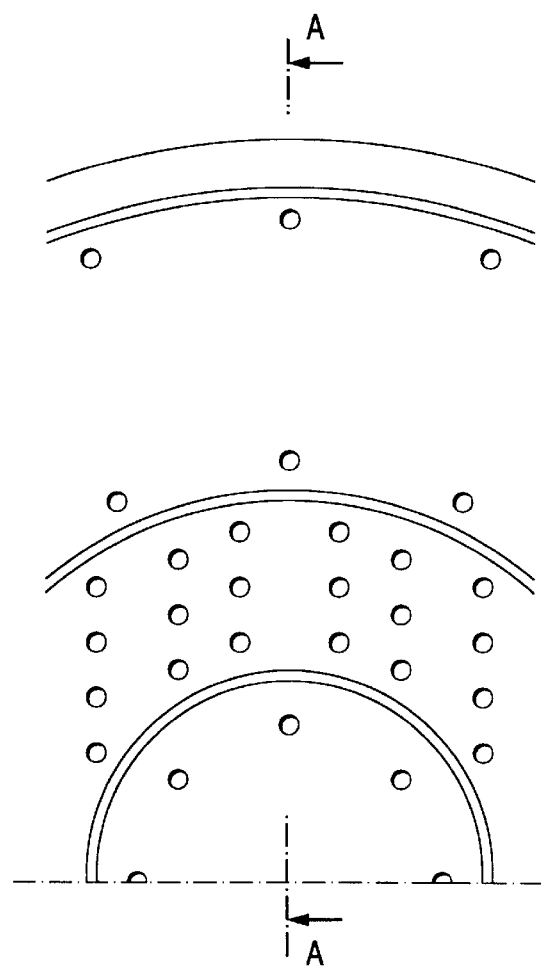

As shown in FIGS. 1(a) and 4(b), in the present invention, retaining boards 14 and 18 having vacuum heat-insulating layers 17 and 21 are provided in the die surface except the hardening layer 13 of the granulating die 1, namely, the surfaces of the granulating die 1 which are outside and inside of the hardening layer 13.

The outside retaining board 14 outside the hardening layer 13 includes a stainless steel annular board 15 which has a recess in its side; and a stainless steel annular board 16 which is welded to the bottom of the aforementioned recess with a gap (0.5 to 1 mm). Those boards 15 and 16 are welded together as follows: The boards 15 and 16 combined with each other are set in a vacuum chamber, and the degree of vacuum in the vacuum chamber is set to $5 \times 10^{-3}$ torr or less. Under this condition, the joining parts of the boards 15 and 16 are welded together by electronic beam welding. Thus, the vacuum heat-insulating layer 17 has been formed.

The inside retaining board 18 inside the hardening board 13 includes: a stainless steel circular board 19 which has a recess in its side; and a stainless steel circular board 20 which is welded to the bottom of the aforementioned recess with a gap (0.5 to 1 mm). Those boards 19 and 20 are welded together as follows: Similarly as in the above-described case, in the vacuum chamber, the joining parts of the boards 19 and 20 are welded together by electronic beam welding. Thus, the vacuum heat insulating layer 21 has been formed.

In the surface outside the hardening layer 13, an annular groove 22 is formed which is to mount the aforementioned outside retaining board. The annular groove 22 is tapered towards the hardening layer. On the other hand, in the surface inside the hardening layer 13, an annular groove 23 is formed which is to mount the aforementioned inside retaining board. The periphery of the annular groove 23 is tapered.

The above-described outside and inside retaining boards 14 and 18 are fixedly mounted through seal gaskets 24 and 25 on the granulating die 1 with bolts 26, respectively. When the retaining boards 14 and 18 are fixedly mounted as was described above, the surface of the hardening layer 13 of the granulating die 1 becomes higher about 3 mm than the retaining boards 14 and 18. The purpose of use of the aforementioned gaskets 24 and 25 are for sealing instead of heat insulating, and therefore they may be thin, about 1 to 2 mm in thickness.

Now, the operation of the underwater granulating machine will be described.

In FIG. 2, the molten resin in the extruding machine is passed through the die head 31 and is then formed into cylindrical molten resin pieces by means of the number of nozzle holes 2 in the granulating die 1. The cylindrical molten resin pieces are immediately cooled and solidified by the circulating water, and then cut by the cutter blades to a predetermined length, thus being formed into pellets 37. The pellets 37 thus formed are moved to a pellet dehydrating and drying device by the circulating water.

In this operation, the heating fluid led in from the lead-in path 8 of the granulating die 1 flows through the one outside annular path 5a, the heating jackets 3 formed on both sides of the lines of nozzles holes 2, the inner annular path 6 (part of the fluid passing through only the heating jacket), and the other outside annular path 5b to the lead-out path 9, thus being discharged therefrom.

The surface of the granulating die 1 is cooled, being in contact with the circulating water. On the other hand, the surface in which the nozzle holes 2 are formed is not cooled, because the vacuum heat-insulating layers 4 are formed on the surface side of the granulating die 1 in such a manner that they are adjacent to the heating jackets 3. Hence, the nozzle holes 2 can be sufficiently heated with the heating fluid flowing in the heating jackets. The surface except the hardening layer 13, namely, the surfaces outside and inside of the hardening layer 13 are covered with the outside and inside retaining boards 14 and 18, respectively, which is heat-insulated by vacuum means. Therefore, the temperature of the whole granulating die 1 will not be decreased.

The synthetic resin granulating die according to the invention is designed as described above. Hence, the nozzle holes are prevented from being excessively cooled by the circulating water; that is, the nozzles holes are prevented from being clogged up. Accordingly, the pellets formed are fined in quality.

What is claimed is:

1. A synthetic resin granulating die comprising:
   a die body;
   a hardening layer having a number of nozzle holes, connected to said die body; and
   an annular outside retaining board having a vacuum heat insulating layer, wherein said outside retaining board is provided on a surface of said die body adjacent the outside, in a radial direction, of said hardening layer.

2. A synthetic resin granulating die as claimed in claim 1, further comprising:
   a circular-disk-shaped inside retaining board having a vacuum heat insulating layer, wherein said inside retaining board is provided on a surface of said die body adjacent the inside, in the radial direction, of said hardening layer.

3. A synthetic resin granulating die as claimed in claim 1, wherein said annular outside retaining board is formed by welding the peripheries of two pieces of stainless steel boards together by electronic beam welding with a gap between said peripheries.

4. A synthetic resin granulating die as claimed in claim 2, whererin each of said retaining boards is formed by welding the peripheries of two pieces of stainless steel boards together by electronic beam welding with a gap between said peripheries.

5. A synthetic resin granulating die as claimed in any one of claims 1 to 4, further comprising:

vacuum heat-insulating layers provided on the die surface side of heating jackets provided between a number of lines of said nozzles holes.

6. A synthetic resin granulating die as claimed in claim 3, further comprising a seal gasket between said synthetic resin granulating die and said annular outside retaining board.

7. A synthetic resin granulating die as claimed in claim 4, further comprising a seal gasket between said synthetic resin granulating die and said circular-disk-shaped inside retaining board.

8. A synthetic resin granulating die as claimed in claim 1, wherein said annular outside retaining board is removably mounted to said granulating die.

9. A synthetic resin granulating die as claimed in claim 8, wherein said annular outside retaining board is removably mounted to said granulating die by bolts.

10. A synthetic resin granulating die as claimed in claim 1, wherein said annular outside retaining board comprises a first annular board and a second annular board, wherein said first annular board has a recess in one side and said second annular board is disposed over said recess, said second annular board being connected to said first annular board so that said vacuum heat insulating layer is formed between said first annular board and said second annular board.

11. A synthetic resin granulating die as claimed in claim 2, wherein said inside retaining board comprises a first circular board and a second circular board, wherein said first circular board has a recess in one side and said second circular board is disposed over said recess, said second circular board being connected to said first circular board so that said vacuum heat insulating layer of said circular-disk-shaped inside retaining board is formed between said first circular board and said second circular board.

* * * * *